(12) United States Patent
Blasco Remacha

(10) Patent No.: US 6,674,207 B2
(45) Date of Patent: Jan. 6, 2004

(54) ELECTRONICALLY COMMUTATED MACHINE, IN PARTICULAR MOTOR

(75) Inventor: Carlos Blasco Remacha, Huesca (ES)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 10/070,175
(22) PCT Filed: Jul. 17, 2001
(86) PCT No.: PCT/DE01/02666
§ 371 (c)(1),
(2), (4) Date: Jun. 11, 2002
(87) PCT Pub. No.: WO02/09257
PCT Pub. Date: Jan. 31, 2002

(65) Prior Publication Data
US 2002/0153797 A1 Oct. 24, 2002

(30) Foreign Application Priority Data
Jul. 26, 2000 (DE) .......................................... 100 36 289

(51) Int. Cl.⁷ ............................................... H02K 3/00
(52) U.S. Cl. ........................ 310/184; 310/179; 310/198
(58) Field of Search ................................ 310/184, 179, 310/180, 198, 254

(56) References Cited

U.S. PATENT DOCUMENTS

| 4,780,634 A | * | 10/1988 | Masterman |
| 4,983,867 A | * | 1/1991 | Sakamoto |
| 5,057,731 A | * | 10/1991 | Hancock |
| 5,804,904 A | * | 9/1998 | Park et al. |
| 5,825,111 A | * | 10/1998 | Fei |
| 5,918,347 A | * | 7/1999 | Morawetz |
| 6,376,960 B1 | * | 4/2002 | Milet et al. |
| 6,472,790 B2 | * | 10/2002 | Rose, Sr. |

FOREIGN PATENT DOCUMENTS

| DE | 197 25 525 A | 12/1998 |
| RU | 2 067 348 C | 9/1996 |
| WO | 00 48292 A | 8/2000 |

* cited by examiner

Primary Examiner—Thanh Lam
(74) Attorney, Agent, or Firm—Michael J. Striker

(57) ABSTRACT

In an electronically commutated electrical machine, in particular motor, having a stator (30) that has primary teeth (34) partitioned off by slots (33), and having a stator winding (37), produced of insulated winding wire (38), that has k winding phases (41–44), each with l parallel branches (45) each of m series-connected coils (40), placed in the slots (33) and wound around the primary teeth (34), as well as contact hooks (39) connected to the l parallel branches (45) of each winding phase (41–44), which contact hooks form phase terminals (B1, B2, A2, A1) and star points (SB, SA) of each winding phase (41–44), where k, l and m are integers greater than 1, in order to optimize the laying of winding wire around the winding holder, some of the l parallel branches (45), belonging to one winding phase (41–44), are contacted to the star point (SB, SA) of another winding phase (44–41).

5 Claims, 3 Drawing Sheets

ELECTRONICALLY COMMUTATED MACHINE, IN PARTICULAR MOTOR

PRIOR ART

The invention is based on an electronically commutated electrical machine, in particular a motor, as generically defined by the preamble to claim 1.

In a known electronically commutated motor, also known as a brushless motor, of this type (German Patent Disclosure DE 197 25 525 A1), the coils of each winding phase of the two-phase stator winding are wound with their coils around every other tooth, with the direction of winding changing upon each successive coil. A total of eight teeth are wound. In multi-phase windings where k>2, the number n of teeth n=k·v, where v is an even-numbered multiple. In a four-phase winding, that is, a stator winding with four phases, at a multiple v=2 once again eight teeth are produced.

Figure 1:
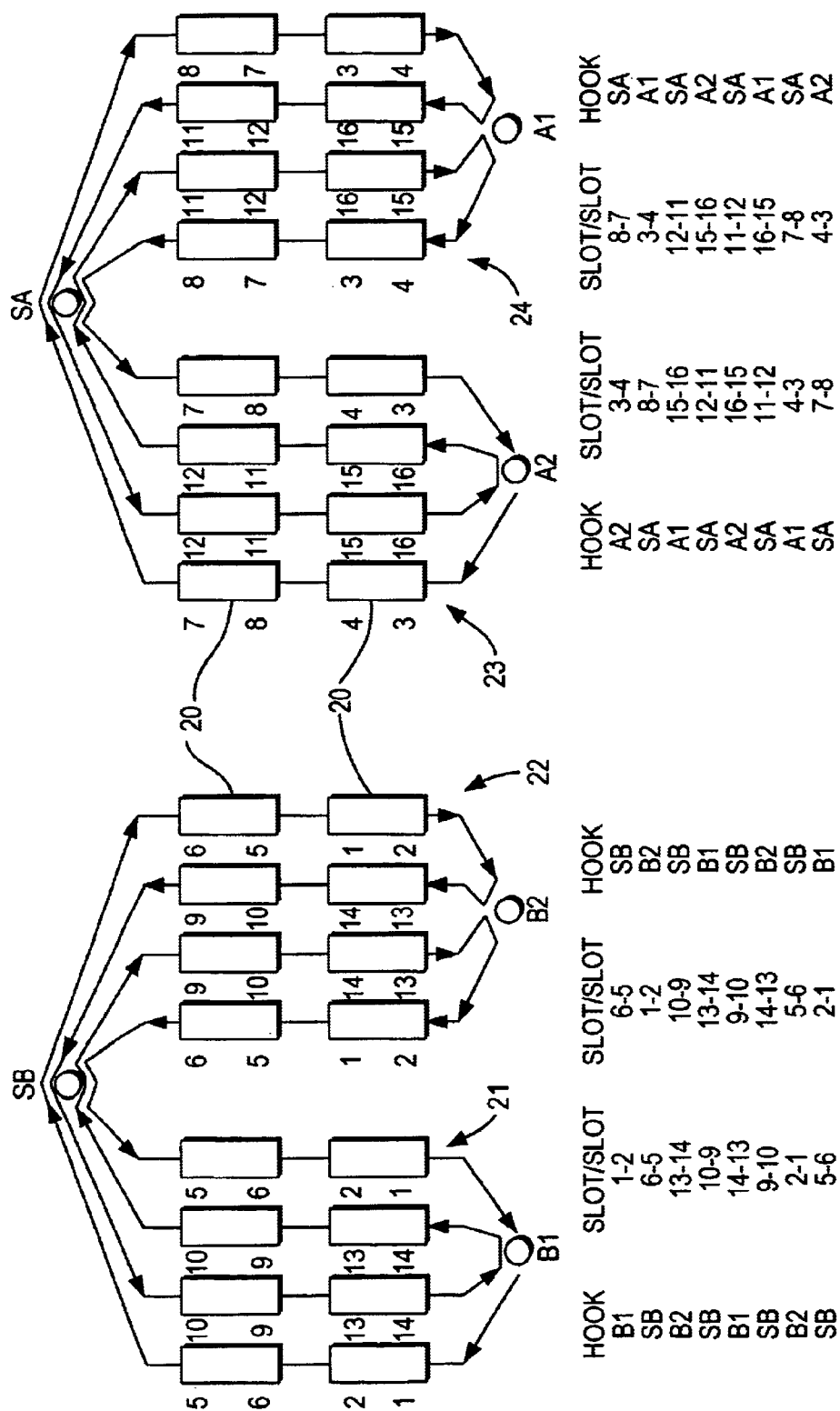

The winding diagram of the stator winding in the known motor is shown in FIG. 1 in a four-phase version (k=4) with four parallel branches (l=4) and two series-connected coils per branch (m=2). In the four winding phases 21, 22, 23, 24, which each include all the coils 20 of one winding phase, two strands 21, 22 on the one hand and 23, 24 on the other are wound onto the same teeth via the same slots. The contact hooks for the strand terminals are identified by the symbols B1, B2, A2, A1, and the contact points for the star points, of which two star points each, belonging to the respective winding phases 21 and 22 on the one hand and 23 and 24 on the other, are combined, are marked SB and SA. All the contact hooks are disposed on the inner edge of the annular stator, on the same side of the stator. The wire segments of the winding wire, leading from the contact hooks to the coils and from one coil to the next, in the winding are also laid along the lower edge of the stator, on the same face end, in the circumferential direction. In FIG. 1, the rectangles represent the individual coils 20 wound onto the teeth. The numerals 1–16 next to the rectangles are the ordinal numbers of successive slots in the circumferential direction between the teeth, on the one hand, and the auxiliary teeth, on the other. The caption "Hooks" designates the contact hooks both for the phase terminals B1, B1, A2 and A1, and for the star points SB and SA, which electrically and mechanically connect the respective four parallel branches of the winding phases 21–24 with a respective two series-connected coils 20. The arrowheads shown in the winding wire segments between coils 20 indicate the direction in which the winding wire runs. The winding of the teeth can be seen from the slot sequence; the tooth located between slots 1 and 2 is wrapped multiple times from slot 1 to slot 2, which is expressed by the caption "slot/slot 1–2".

The winding wire course illustrated in the winding diagram of FIG. 1 for producing the stator winding is not optimal in terms of the fact that the winding wire when suspended from the hooks of the associated star point SA or SB must often be laid over long distances on the face end of the stator, resulting in a high number of conductors in that region.

ADVANTAGES OF THE INVENTION

The electronically commutated or brushless electrical machine, in particular motor, of the invention as defined by the characteristics of claim 1 has the advantage of a stator winding structure that is both simple and optimized in terms of production. By the contacting according to the invention of individual branches of each winding phase at the star point of another winding phase, the wire segments leading from one coil to another can be much better distributed around the stator, and the number of encompassing wires can be minimized. The wire segments that connect the coils can be optimized in terms of their length, so that because the resistances are approximately the same, an improvement in the symmetry of the phases can be achieved, and thus in the case of the motor, a better supply of electrical current is made possible.

By the provisions recited in the other claims, advantageous refinements of and improvements to the electrical machine, in particular the motor, recited in claim 1 are possible.

In a preferred embodiment of the invention, the stator winding is embodied as four-phase (k=4), with four parallel branches per winding phase (l=4); respective winding phases of the stator winding whose coils are wound onto the same teeth are contacted at a common star point. Two branches per phase are carried to the common star point belonging to that phase, and another two branches per phase are carried to the other star point and contacted at that other star point. The star points are electrically connected to one another at an arbitrary point.

DRAWING

Figure 2:
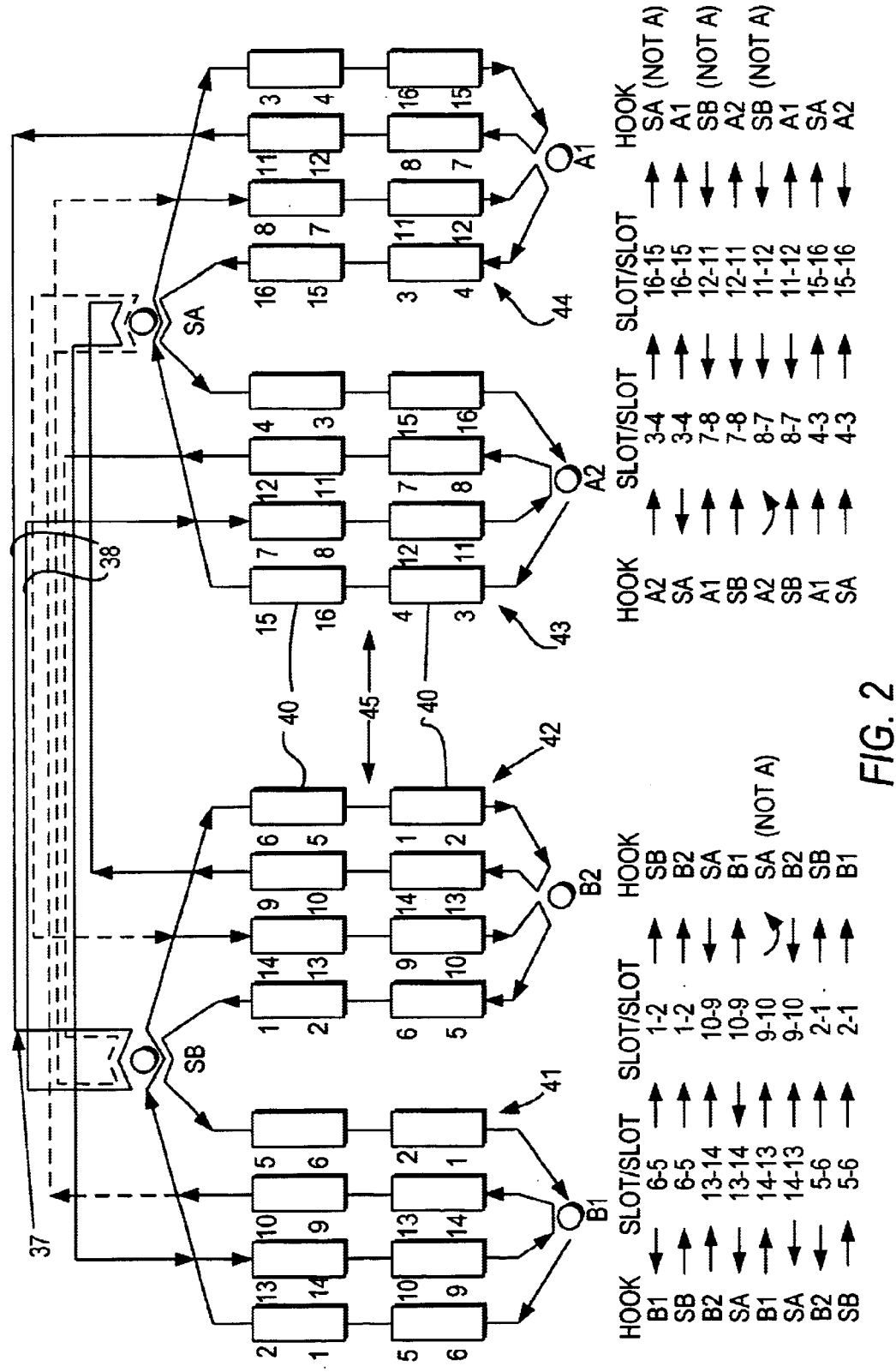
Figure 3:
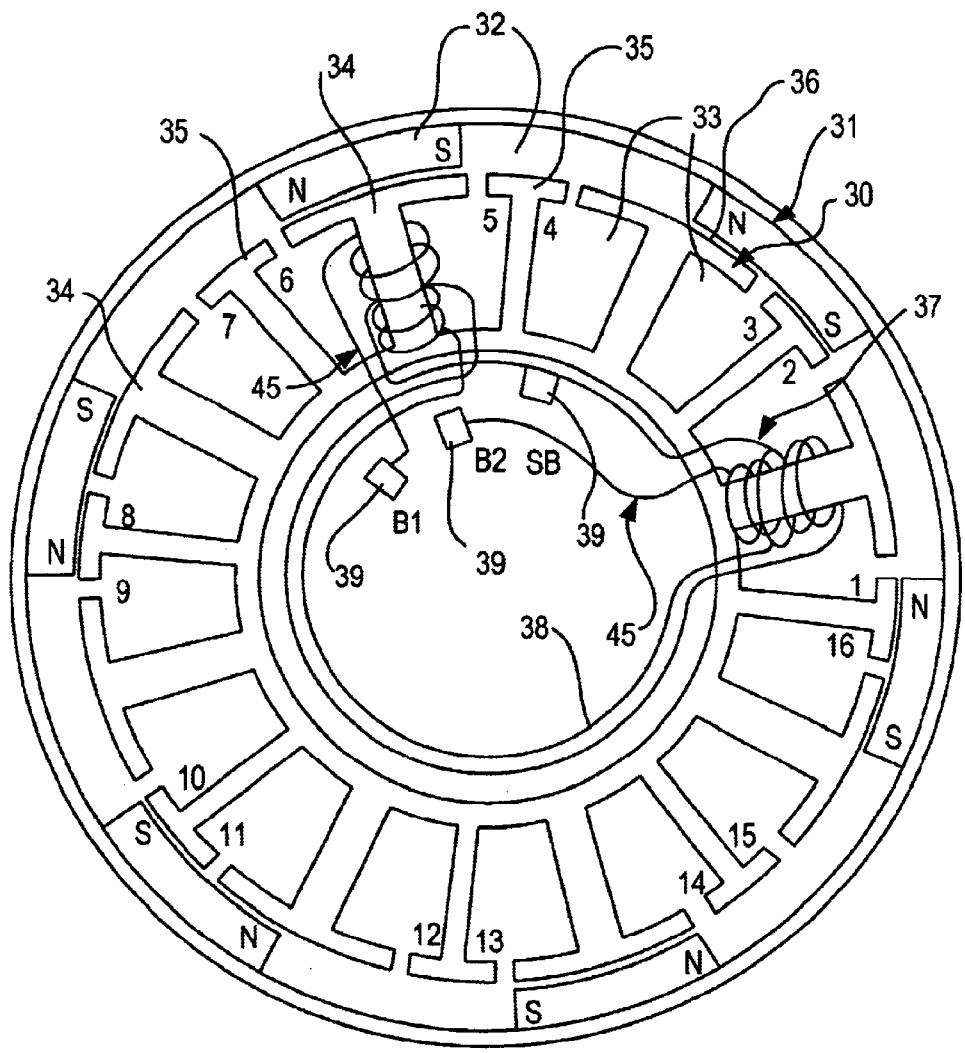

The invention is explained in further detail in the ensuing description in terms of an exemplary embodiment shown in the drawing. Shown are:

FIG. 1, a winding diagram of the known stator winding, described at the outset, for an electronically commutated motor;

FIG. 2, the same winding diagram for the stator winding of the invention for an electronically commutated motor;

FIG. 3, a schematic illustration of an end view of an electronically commutated motor, with a detail of a stator winding of FIG. 2.

DESCRIPTION OF THE EXEMPLARY EMBODIMENT

The electronically commutated motor schematically shown in FIG. 3, as an exemplary embodiment for a generally brushless electrical machine, has a stator 30, which is concentrically surrounded by a rotor 31. The rotor 31 has alternating north and south poles N and S on its inside circumference, which are formed by permanent magnet segments 32 that face with concave pole faces toward the stator 30. The stator 30 is subdivided by slots 33, which partition off T-shaped primary teeth 34 and T-shaped auxiliary teeth 35. Depending on the stator concept, the auxiliary teeth 35 can also be omitted. The primary teeth 34 and auxiliary teeth 35 face with convex pole faces toward the rotor 31, and an air gap 36 is formed between the pole faces of the rotor 31 and stator 31. The surfaces toward the air gap of the primary teeth 34 extend over approximately the same angular range as the permanent magnet segments 32, while the surfaces of the narrower auxiliary teeth 35 toward the air gap are only about half as large.

The primary teeth 34 have a stator winding 37, which is produced by winding an insulated winding wire 38 around the primary teeth 34; the winding wire 38 occupies both slots 33 adjoining a given primary tooth 34 and is inserted into one slot 33 and emerges from the other slot 33. The ordinal numbers of the slots 33 are shown in FIG. 3 as 1–16. The stator winding 37 is embodied with k winding phases, which each have l parallel branches each of m series-connected coils placed in the slots 33 and wrapped around the teeth 34 (k, l and m are each integers greater than 1). The l parallel branches of each of the k winding phases are connected to one another via contact hooks 39, which form the phase terminal and star point of each winding phase.

As the winding diagram in FIG. 2 shows, in the exemplary embodiment described the stator winding 37 is embodied in four-phase form; that is, it has four winding phases 41–44, and each phase is embodied with four parallel branches 45, each comprising two series-connected coils 40. The four branches 45 of the winding phase 41 are contacted on the contact hooks 39 that form the phase terminal B1, and the branches 45 of the winding phase 42 are contacted on the contact hooks 39 that form the phase terminal B2. Both winding phases 41, 42 are assigned the same star point SB, which is also located on a contact hook 39. The branches 45 of the winding phase 43 are contacted on the contact hook 39 that forms the phase terminal A2, and the four branches 45 of the winding phase 44 are contacted on the contact hook 39 that forms the phase terminal A1. For the two winding phases 43, 44, one star point SA is provided, which is again formed by a contact hook 39.

The winding diagram in the upper part of FIG. 2 as a block circuit diagram, with coils 40, phase terminals B1, B2, A2, A1, star points SB, SA, and a winding wire course. The arrowheads shown in the winding wire indicate the direction in which the winding wire runs. The winding wire is wrapped z times around each primary tooth 34 (FIG. 3) and in each case forms one coil 40. In the lower part of FIG. 2, the winding diagram is shown again numerically in its sequence. The arrows between the captions "Hooks" and "Slot/Slot" indicate the direction of the encompassing winding wire in the counting direction of the slots (increasing ordinal numbers 1–16 of the slots); the arrows pointing to the right symbolize the travel direction of the winding wire in the counting direction, and the arrows pointing to the left symbolize the travel direction of the winding wire counter to the counting direction.

The winding diagram is self-explanatory. Merely for the sake of introduction, part of the winding course will be explained:

The winding wire runs counter to the counting direction from hook B1 to slot 6, where it wraps several times (z times) around the primary tooth between slots 6 and 5, and is carried out of the slot 5 in the counting direction toward slot 1, where it is wound multiple times onto the primary tooth by way of the slot 2. From slot 2, the wire is carried in the counting direction to hook B2, from there in the counting direction to slot 6, wraps around the primary tooth between slots 6 and 5, and is carried out of slot 5 in the counting direction to slot 1, where via the slot 2 it is also wound multiple times around the primary tooth. The winding wire emerging from slot 2 is carried to hook B2.

This part of the winding diagram is schematically shown in FIG. 3, in order to illustrate the three-dimensional association of the stator winding 37 with the stator 30. As seen from FIG. 3, the wire segments between slots 5/1 and 2/6 are carried (via SB) along the lower edge of the stator 30 on the same face end of the stator 30 on which the contact hooks 39 are also disposed. As not further shown in FIG. 3, the wire segments are received in a plastic, annular winding holder, which is inserted into the inner cavity of the stator 30 and is held there, for instance by nonpositive engagement, on the inner annular jacket of the stator 30.

If the winding diagram is pursued further in FIG. 2, then beginning at hook B2 the winding wire is carried in the counting direction to slot 13, where it is wound multiple times around the primary tooth via the slot 14, and from slot 14 it is carried in the counting direction to slot 10, where it is again wound multiple times around the primary tooth via the slot 9. From slot 9, the winding wire does not—as was previously usual (see FIG. 1)—run to the wire segment SB; instead, it is carried counter to the counting direction to the other wire segment SA, and from there counter to the counting direction to slot 13. From slot 13, the wire is wound via the slot 14 multiple times around the primary tooth, and from slot 14 it is carried counter to the counting direction to slot 10, where it is again wound around the primary tooth via the slot 9, and then is carried in the counting direction to the hook B1. The further winding course can now easily be understood from the winding diagram. The two curved arrows for the travel direction of the winding wire mean that the winding wire must be wrapped completely around the winding holder once, in order to avoid intersections. The winding wire is suspended by α loops from the hooks 39. Wherever that is not the case, it is so noted at the applicable hook.

Once the stator 30 has been wound completely, a total of four coils 40, each belonging to one of the two winding phases 41, 42 and 44, are located on each primary tooth 34. Of the winding phases 41 and 42, the two branches 45 which with their coils 40 occupy the slots 14/13 and 10/9 (the middle ones in FIG. 2) are carried to the star point SA (and not, like the others, to the star point SB), and of the winding phases 43 and 44, the two branches 45 which with their coils 40 occupy the slots 7/8 and 12/11 (the middle ones in FIG. 2) are carried to the star point SB (and not, like the others, to the star point SA). These coils 40 are then contacted at these respective star points SA and SB. By this distribution of star points to branches 45 belonging to different winding phases 41–44, the wire course around the winding holder can be optimized; approximately equal-length wire segments can be achieved, and the number of encompassing wires around the winding holder can be minimized. The star points SA, SB are connected to one another at an arbitrary point.

The invention is not limited to the four-phase winding described in the exemplary embodiment. A three-phase winding is equally possible, in which case the contacting of branches of one or more of the three winding phases to the star points belonging to the other winding phases makes it possible to optimize the winding wire course.

What is claimed is:

1. An electronically commutated electrical machine, in particular motor, having a stator (30) that has primary teeth (34) partitioned off by slots (33), and having a stator winding (37), produced of insulated winding wire (38), that has k winding phases (41–44), each with l parallel branches (45) each of m series-connected coils (40), placed in the slots (33) and wound around the primary teeth (34), as well as contact hooks (39) connected to the l parallel branches (45) of each winding phase (41–44), which contact hooks form phase terminals (B1, B2, A2, A1) and star points (SB, SA) of each winding phase (41–44), where k, l and m are integers greater than 1, characterized in that some of the l parallel branches (45), belonging to one winding phase (41–44), are contacted to the star point (SB, SA) of another winding phase (44–41).

2. The machine of claim 1, characterized in that the contact hooks (39), forming the phase terminals (B1, B2, A2, A1) and star points (SB, SA) of the winding phases (41–44), are disposed on the inner edge of the annular stator (30), on the same side of the stator (30), and the wire segments connecting the individual coils (40) are laid along the inner edge of the annular stator (30).

3. The machine of claim 1, characterized in that the winding wire (38), depending on the location of the next coil (40) in the stator (30), is either suspended with α loops from the contact hooks (39) or is laid along and in contact with the contact hooks (39), and that all the winding wire segments located at the contact hooks (39) are connected electrically and mechanically to the contact hooks (39).

4. The machine of claim 1, characterized in that in a four-phase version of the stator winding (37), two winding phases (41, 42), or (43, 44) of the stator winding (37), whose coils (40) are wound onto the same primary teeth (34), are each contacted at a common star point (SB, SA), and that when there are four parallel branches (45) per winding phase (41–44), two branches per winding phase (41, 44) are carried to the common star point (SB, SA) belonging to the winding phase (41–44), and two branches per winding phase (41–44) are carried to the other star point (SA, SB) and contacted respectively at the star points (SA, SB).

5. The machine of claim 1, characterized in that the star points (SA, SB) are connected to one another externally.

* * * * *